United States Patent [19]
Ray et al.

[11] 3,962,138
[45] June 8, 1976

[54] COBALT-OXIDE-BASED CATALYTIC SUBSTANCES FOR THE OXIDATION OF AMMONIA

[75] Inventors: Jean-Louis Ray, Fontaine, Saone; Robert Laugier, Fresnes, both of France

[73] Assignee: Rhone-Progil, Courbevoie, France

[22] Filed: Mar. 18, 1974

[21] Appl. No.: 451,882

[30] Foreign Application Priority Data
Mar. 20, 1973 France .............................. 73.09862

[52] U.S. Cl. ............................ 252/462; 252/466 J; 423/392
[51] Int. Cl.$^2$ .................... B01J 21/04; B01J 23/10; B01J 23/80
[58] Field of Search ........................ 252/462, 466 J; 423/392, 404; 106/73.4

[56] References Cited
UNITED STATES PATENTS

| | | | |
|---|---|---|---|
| 858,904 | 7/1907 | Ostwald | 423/404 |
| 1,207,706 | 12/1916 | Bosch et al. | 423/404 |
| 1,399,807 | 12/1921 | Scott | 423/404 |
| 1,713,045 | 5/1929 | Jacobson | 423/404 |
| 1,919,005 | 7/1933 | Bray | 423/404 |
| 2,467,446 | 4/1949 | Smithells | 423/404 |

FOREIGN PATENTS OR APPLICATIONS

| | | | |
|---|---|---|---|
| 137,071 | 1/1921 | United Kingdom | 423/404 |
| 1,236,819 | 6/1971 | United Kingdom | 423/404 |

*Primary Examiner*—W. J. Shine
*Attorney, Agent, or Firm*—McDougall, Hersh & Scott

[57] ABSTRACT

The invention concerns catalytic substances for the oxidation of ammonia, for the production of nitric acid, comprising cobalt oxide as the main component. Such substances, besides cobalt oxide, also contain additives formed of aluminum oxide and possibly oxides of thorium, cerium, zinc and cadmium, the amount of aluminum oxide added being from 5% to 15% by weight of the finished substances and the amount of the other oxides being from 0 to 25% by weight of the finished substances; these substances are in particular shaped by pelleting or extrusion, dried and then calcined at temperatures of the order of from 900° to 1000°C. The advantages of these catalytic substances lie in a high degree of activity and a high level of strength, which are maintained during use thereof.

4 Claims, No Drawings

COBALT-OXIDE-BASED CATALYTIC SUBSTANCES FOR THE OXIDATION OF AMMONIA

The present invention concerns catalytic substances for the oxidation of ammonia for the production of nitric acid, comprising cobalt oxide as the principal component.

It is known that the production of nitric acid from nitrogen oxides, produced by the oxidation of ammonia, is almost universally dependent on the use of catalysts comprising platinum which in most cases is alloyed with rhodium and shaped into metal plates. Obviously, such catalysts suffer in use from disadvantages of an economic nature which are increased by the modern methods which use a pressure which, while reducing pollution, very substantially increases the losses in respect of precious metals.

Research has been going on for a long time towards the elimination or at least reduction of the use of such precious metals in the catalysts. For this purpose, catalysts on carriers based on the above precious metals, catalysts based on various metal oxides, and catalysts combining these two types of catalytic members, have been proposed.

Among the various metal oxides which can be used, cobalt oxide is found to be the most active, and the main aim of the early research was further to increase the activity of cobalt oxide by means of numerous additives. However, in spite of the favorable results announced, none of the formulae proposed have been able to gain widespread acceptance in industrial practice.

The reasons for this are various; they include the lack of mechanical strength of the catalysts, the non-reproducibility of the results, very widely varying evolutions, depending on the duration of use, such evolutions generally resulting in a rapid reduction in activity and strength, probably due to changes in the texture and the structure of the catalysts.

The catalytic substance formulae now proposed are subject to little evolution in respect of texture and structure, and contain primarily cobalt oxide having the formula $Co_3O_4$ in a proportion within the range of 60–95% by weight of the finished catalyst, and an additive comprising 5–15% by weight aluminum oxide and possibly 0–25% of at least one of the oxides of the group formed by oxides of thorium, cerium, zinc and cadmium. Other oxides can possibly be present, such as those of the other rare earth metals, and zirconium oxide, without substantially improving the essential qualities of the catalysts. In addition, some other oxides, mainly those of alkali metals, are to be excluded, even when present in small amounts, because they substantially reduce the yield of the reaction, as will be seen if an attempt is made to precipitate active hydroxides by alkali metal carbonates.

More precisely, in practice, the amount of aluminum oxide must not exceed 15% by weight of the finished catalyst and the amount of oxides of the groups comprising oxides of thorium, cerium, zinc and cadmium, should not exceed 25% of the weight of the finished catalyst.

It has in fact been found that, in practice, aluminum oxide alone makes it possible and certain to impart to such catalytic substances the strength which is essential to industrial use, and a good degree of activity, which qualities are maintained over long periods of time.

The catalytic substances, according to the invention, can be formed by any known methods, the most highly recommended in the present case being pelleting, whether dry or not, or extrusion. This latter method is particularly recommended when the formulae used comprise aluminum oxide in the form of hydrated alumina gels, which substantially improve the rheological qualities of the oxide pastes.

The compositions which are subjected to the shaping operation can be produced by mixing oxides and/or compounds which are precursors of such oxides, or by co-precipitation of the oxides or compounds. It is also possible to shape a part of the components of the compositions, and then to carry out an impregnation operation by means of solutions of the desired composition, providing the complementary part. The most highly recommended precursor compounds are hydroxides, oxalates and carbonates, these various components being easily produced, for example, from corresponding nitrates.

After shaping, the catalytic substances are dried, if necessary, and then calcined, in one or more stages, at temperatures of the order of 900°C to 1000°C. It is not generally necessary to exceed the latter temperature. The catalytic substances are then found to have small specific surface areas of about 0.2 to 5 sq.m/g, depending on the compositions and the conditions of calcination. It is moreover not necessary for these specific surface areas to be substantial, due to the short contact times necessary for the oxidation of ammonia to nitrogen oxide.

The following examples are given in order to illustrate the invention, and relate to catalysts produced by pelleting and extrusion, some of the catalysts by way of comparison being outside the formulae which are now proposed in accordance with the invention. All the tests are carried out by placing in a small laboratory reaction vessel having a diameter of 10 cm, 375 ccm of the catalyst in question, and passing into the reaction vessel, at a pressure of from 4 to 5 bars, a gaseous mixture comprising 90% of air and 10% of ammonia by volume. The reaction is started by moderate heating of the gaseous mixture, and is self-maintained, while the catalyst is raised to temperatures of from 650° to 850°C. At the outlet from the reaction vessel, the composition of the gaseous mixture is determined chemically in order to deduce therefrom the efficiency of the reaction in percentage of the ammonia converted. The table, which follows the example, gives this efficiency in respect of conversion of ammonia, for catalysts in the new condition and after 400 hours operation, the specific surface areas expressed in sq. m/g and the resistances to grain-by-grain crushing expressed in kg, for the new catalysts, and the crushing resistance after 400 operating hours for the catalysts.

EXAMPLE 1

This example concerns a catalyst having the following formula by weight: $Co_3O_4$ 90%, $Al_2O_3$ 10%, formed by pelleting. Two liters of a solution containing 488 g of 6 $H_2O$ hydrated cobalt nitrate and 112 g of 9 $H_2O$ hydrated aluminum nitrate is precipitated by a 125 g/l solution of ammonium carbonate, until the pH value is 7.8.

The precipitate is allowed to decant for 2 hours, followed by filtering. The cake obtained is washed with 12 liters of permuted (deionized) water. The cake is then dried in a drying oven at 120°C and then calcined for 2 hours at 550°C. After cooling, the substance is crushed and then put through a sieve; only the particles which have a diameter of from 100 to 400 $\mu$ are retained for the pelleting operation, which is carried out on a conventional machine. The pellets obtained in the crude state are 6 mm in diameter and 5 mm in thickness. After calcination at 1000°C for three hours, their diameter is reduced to 4.5 mm and their thickness to 3 mm.

EXAMPLE 2

This also relates to a catalyst having the composition by weight $Co_3O_4$ 90%, $Al_2O_3$ 10%, but produced by extrusion.

Two liters of a solution containing 582 g of hydrated cobalt nitrate is precipitated by means of a 125 g/l solution of ammonium carbonate, until the pH value is 7.8.

The precipitate is then filtered, washed, calcined and crushed, as in the preceding example. The particles are sieved so as to use all the particles of $Co_3O_4$ which have a diameter of less than 400 $\mu$. An alumina gel containing 13% by weight of alumina is also prepared by continuously precipitating at pH value of 8, from a solution of sodium aluminate having 100 g/l of $Al_2O_3$, by a solution of 200 g/l nitric acid. The gel is filtered and then washed. 50 g of the powder of cobalt oxide and 46 g of the gel prepared are mixed intimately in order to produce a paste.

The paste is then extruded in the form of cylinders which are 6 mm in diameter. After calcination for 3 hours at 1000°C, the diameter of the cylinders is reduced to 4 mm. The calcined extrudates are used in the form of fragments which are from 5 to 10 mm in length.

EXAMPLE 3

This example concerns catalysts having the formula by weight: $Co_3O_4$ 80%, $Al_2O_3$ 10%, $ThO_2$ 10%, the catalysts being produced by pelleting. Two liters of a solution containing 434 g of hydrated cobalt nitrate, 112 g of hydrated aluminum nitrate and 31 g of 4 $H_2O$ hydrated thorium nitrate is precipitated by a 125 g/l solution of ammonium carbonate, until the pH value is 7.8.

Pellets are then produced, and calcined as specified in Example 1.

EXAMPLE 4

This example concerns catalysts which have the formula by weight: $Co_2O_4$ 81%, $ThO_2$ 9%, $Al_2O_3$ 10%, and which are produced by extrusion. Two liters of a solution containing 407 g of hydrated cobalt nitrate and 26 g of hydrated thorium nitrate is precipitated in the same manner as described in the preceding examples, by a 125 g/l solution of ammonium carbonate, until the pH value is 7.8. The precipitate is treated as described in Example 2. To 120 g of this powder, there is added 151.5 g of an aluminum gel containing 8.8% of $Al_2O_3$, prepared by precipitation in a manner similar to that described in Example 2. Production and calcination of the extrudates are the same as described in Example 2.

EXAMPLE 5

This example concerns catalysts which have the formula by weight: $Co_3O_4$ 80%, $Al_2O_3$ 10%, $CeO_2$ 10%, and which are produced by pelleting. Two liters of a solution containing 434 g of hydrated cobalt nitrate, 112 g of hydrated aluminum nitrate and 37.8 g of 6 $H_2O$ hydrated cerium nitrate is precipitated by a 125 g/l solution of ammonium carbonate, until the pH value is 7.8.

As described above in Example 1, the precipitate produced is filtered, washed, crushed and shaped into pellets which are then calcined.

EXAMPLE 6

This example concerns catalysts having the formula by weight: $Co_3O_4$ 81%, $CeO_2$ 9%, $Al_2O_3$ 10%, and which are produced by extrusion. Two liters of a solution containing 488 g of hydrated cobalt nitrate and 37.8 g of hydrated cerium nitrate is precipitated by a 125 g/liter solution of ammonium carbonate until the pH value is 7.8. This precipitate is then filtered, washed, calcined, crushed and graded into particles having a diameter <400 $\mu$. Extrudates are produced in a manner similar to that described in Example 4, by mixing 91 g of the alumina gel containing 8.8% of alumina, as prepared in the manner specified in Example 2, with 72 g of the powder produced by crushing the calcined precipitate, so as to form a paste. The extrudates are then calcined.

EXAMPLE 7

This comparative example relates to catalysts having the formula by weight: $Co_3O_4$ 90%, $CeO_2$ 10%, in the form of pellets. The powder which is used to produce the pellets is that prepared in the previous example, only the particles having a diameter of from 100 to 400 $\mu$ being retained. The calcined pellets are produced as described above in Example 1.

EXAMPLE 8

This comparative example concerns catalysts having the formula by weight: $Co_3O_4$ 90%, $ThO_2$ 10%, in the form of pellets and extrudates. The powder which is used to produce them is produced in accordance with the method of Example 4; it is separated into particles having a diameter of from 100 to 400 $\mu$ for pelleting and < 400 $\mu$ for extrusion. The pellets and extrudates are produced and calcined as described above. The powder which is subjected to extrusion is moistened to a suitable value.

EXAMPLE 9

This comparative example concerns pellets and extrudates of cobalt oxide $Co_3O_4$ alone. This oxide is produced by precipitation of cobalt nitrate by ammonium carbonate; it is then filtered, washed, dried, calcined and crushed. Pelleting is carried out on particles having a diameter of from 100 to 400 $\mu$, and extrusion is performed on particles having a diameter of smaller than 400 $\mu$, as set out above. The catalysts produced are calcined as usual.

EXAMPLE 10

This example concerns catalysts which have the formula by weight: $Co_3O_4$ 90%, $Al_2O_3$ 10%, and which are produced by extrusion. Two liters of a solution containing 582 g of hydrated cobalt nitrate and 131 g of hydrated aluminum nitrate is precipitated by 3 liters of a solution containing 341 g of oxalic acid. The precipitate is left to decant for 2 hours, followed by filtration, washing, drying and calcining for 2 hours at 550°C. After cooling, the product is crushed and then sieved so as to retain only particles having a diameter of less than 400 μ. Extrudates are than manufactured in a manner similar to that described in Example 4, by mixing 95 g of the powder above with 120 g of the alumina gel having 8.8% of alumina, prepared as described above in Example 2, so as to form a paste. The extrudates are then calcined.

EXAMPLE 11

This comparative example concerns catalysts which have the formula by weight: $Co_3O_4$ 90%, $ThO_2$ 10%, and which are produced by pelleting. Two liters of a solution containing 582 g of hydrated cobalt nitrate and 37.4 g of hydrated thorium nitrate is precipitated by 3 liters of a solution containing 280 g of oxalic acid. As described above in Example 1, the precipitate produced is filtered, washed, crushed and shaped into pellets which are then calcined.

EXAMPLE 12

This example concerns catalysts having the formula by weight: $Co_3O_4$ 81%, $ThO_2$ 9%, $Al_2O_3$ 10%, produced by extrusion. 130 g of the powder produced in Example 11 is mixed, using grains having a diameter <400 μ, with 164 g of the alumina gel containing 8.8% of alumina, prepared as set out above in Example 2. The extrudates are prepared in a manner similar to that described in Example 2, and are then calcined.

addition of alumina to the cobalt oxide increases the levels of efficiency of oxidation of ammonia, which levels moreover have a lesser tendency to drop with the passage of time than the levels achieved with cobalt oxide alone. Finally, the addition of cerium oxide and thorium oxide makes it possible to improve, yet a little further, maintenance of the levels of efficiency with the passage of time.

We claim:

1. Shaped catalytic substances for the oxidation of ammonia, for the production of nitric acid, having a high mechanical strength and a long life, characterized in that they are devoid of alkali metals and formed of a mixture of calcined bodies of 60-95% by weight tricobalt tetraoxide, 5-15% by weight of aluminum oxide and 0 to 25% by weight of an oxide of a metal selected from the group consisting of thorium, cerium, zinc and cadmium.

2. Catalytic substances according to claim 1, characterized in that they also contain at least one of the oxides selected from the group consisting of zirconium oxide and the oxides of rare earth metals other than cerium oxide.

3. A method of producing the catalytic substances according to claim 1, characterized in that the oxides are shaped, dried and calcined at a temperature of the order of from 900° to 1000°C.

4. A method of producing catalytic substances ac-

|  | FORMULAE BY WEIGHT | Examples | Shaping | NEW CONDITION S Sq.m/g | Crushing resistance kg | Yield of $NO + NO_2$ | After 400 hours of operation Crushing resistance | Yield of $NO + NO_2$ |
|---|---|---|---|---|---|---|---|---|
|  | $Co_3O_4$ 90% + $Al_2O_3$ 10% | 1 | Pellets | 0.5 | 18 | 95 | 18 | 93 |
|  |  | 2 | Extrudates | 0.7 | 14 | 93.5 | 15 | 92.5 |
| Precipitation by | $Co_3O_4$ 80% + $Al_2O_3$ 10% + $ThO_2$ 10% | 3 | Pellets | 3.3 | 16 | 95.3 | 16.5 | 94.8 |
| ammonium | $Co_3O_4$ 81% + $ThO_2$ 9% + $Al_2O_3$ 10% | 4 | Extrudates | 2.3 | 14 | 96 | 14.9 | 95.4 |
| carbonate | $Co_3O_4$ 80% + $Al_2O_3$ 10% + $CeO_2$ 10% | 5 | Pellets | 1 | 18 | 94 | 20 | 93.2 |
|  | $Co_3O_4$ 81% + $CeO_2$ 9% + $Al_2O_3$ 10% | 6 | Extrudates | 1.7 | 14 | 94.6 | 15.5 | 93.3 |
|  | $Co_3O_4$ 90% + $CeO_2$ 10% | 7 | Pellets | 1.6 | 2.2 | 93 | 2.3 | 91 |
|  | $Co_3O_4$ 90% + $ThO_2$ 10% | 8 | Pellets | 3 | 6 | 94 | 6.5 | 93 |
|  |  |  | Extrudates | 3.2 | 1.5 | 96 | 1.2 | 94 |
|  | $Co_3O_4$ | 9 | Pellets | 0.2 | 4 | 88 | 3.5 | 82 |
|  |  |  | Extrudates | 0.3 | 1.2 | 87 | 1 | 83 |
| Precipitation | $Co_3O_4$ 90% + $Al_2O_3$ 10% | 10 | Extrudates | 0.3 | 17 | 94.7 | 18 | 93.2 |
| by oxalic | $Co_3O_4$ 90% + $ThO_2$ 10% | 11 | Pellets | 2.1 | 7.5 | 95 | 6.8 | 93.6 |
| acid | $Co_3O_4$ 81% + $ThO_2$ 9% + $Al_2O_3$ 10% | 12 | Extrudates | 2 | 15 | 94.5 | 15.4 | 94 |

The results of this table clearly show that only the catalysts which contain alumina have a high resistance to crushing, which moreover tends to increase with the passage of time, whereas the resistance of the catalysts without alumina, which is much lower, tends to decrease. The results in the table also clearly show that cording to claim 1, characterized in that they are shaped by extrusion, which is followed by drying, and calcining at a temperature of the order of from 900° to 1000°C.

* * * * *